US005468542A

United States Patent [19]
Crouch

[11] Patent Number: 5,468,542
[45] Date of Patent: Nov. 21, 1995

[54] METHOD FOR PRODUCTION OF A COATED SUBSTRATE WITH CONTROLLED SURFACE CHARACTERISTICS

[75] Inventor: Earl T. Crouch, Evansville, Ind.

[73] Assignee: General Electric Company, Pittsfield, Mass.

[21] Appl. No.: 484,467

[22] Filed: Feb. 22, 1990

Related U.S. Application Data

[63] Continuation of Ser. No. 171,207, Mar. 18, 1988, abandoned, which is a continuation of Ser. No. 812,619, Dec. 23, 1985, abandoned.

[51] Int. Cl.⁶ ............................ B05D 3/06; B32B 27/36; B32B 7/02
[52] U.S. Cl. .................... 428/215; 427/495; 427/508; 427/510; 428/412
[58] Field of Search ....................... 427/495, 508, 427/510; 428/412, 213, 215, 335, 337

[56] References Cited

U.S. PATENT DOCUMENTS

| | | |
|---|---|---|
| 3,655,481 | 4/1972 | Hall . |
| 3,658,620 | 4/1972 | Hall . |
| 3,666,591 | 5/1972 | Hall . |
| 3,669,792 | 6/1972 | Hall et al. . |
| 3,689,346 | 9/1972 | Rowland ........................... 156/245 |
| 4,057,657 | 11/1977 | Garnett . |
| 4,198,465 | 4/1980 | Moore et al. . |
| 4,384,911 | 5/1983 | Berg et al. . |
| 4,420,502 | 12/1983 | Conley ........................... 427/54.1 |
| 4,427,732 | 1/1984 | Gray, III et al. . |
| 4,464,220 | 8/1984 | Beer . |
| 4,477,529 | 10/1984 | Campbell . |
| 4,478,876 | 10/1984 | Chung . |
| 4,528,261 | 7/1985 | Hauser ........................... 430/322 |
| 4,548,884 | 10/1985 | Heiart ........................... 430/322 |

FOREIGN PATENT DOCUMENTS 2705273  8/1978  Germany .............................. 118/642

OTHER PUBLICATIONS

T. J. Menezes et al., *Commercial EB Curing Applications—A Progress Report;* Radiation Curing; May, 1985; pp. 2–9.
Article, *In Situ UV Pattern Coating,* 1985 Polymers, Laminations & Coatings Conference, F. Gary Ficker and D. Mark Leazer.

*Primary Examiner*—Marianne Padgett

[57] ABSTRACT

A method for providing an abrasion-resistant, radiation-cured coating on a surface of a polymeric substrate is disclosed, as well as the article produced from the method. The uncured coating material is applied to the substrate, followed by the expulsion of air from the coating. The coating is then cured by directing the radiant energy through the substrate from the surface opposite the surface having the coating thereon to contact the radiation-curable coating.

14 Claims, 1 Drawing Sheet

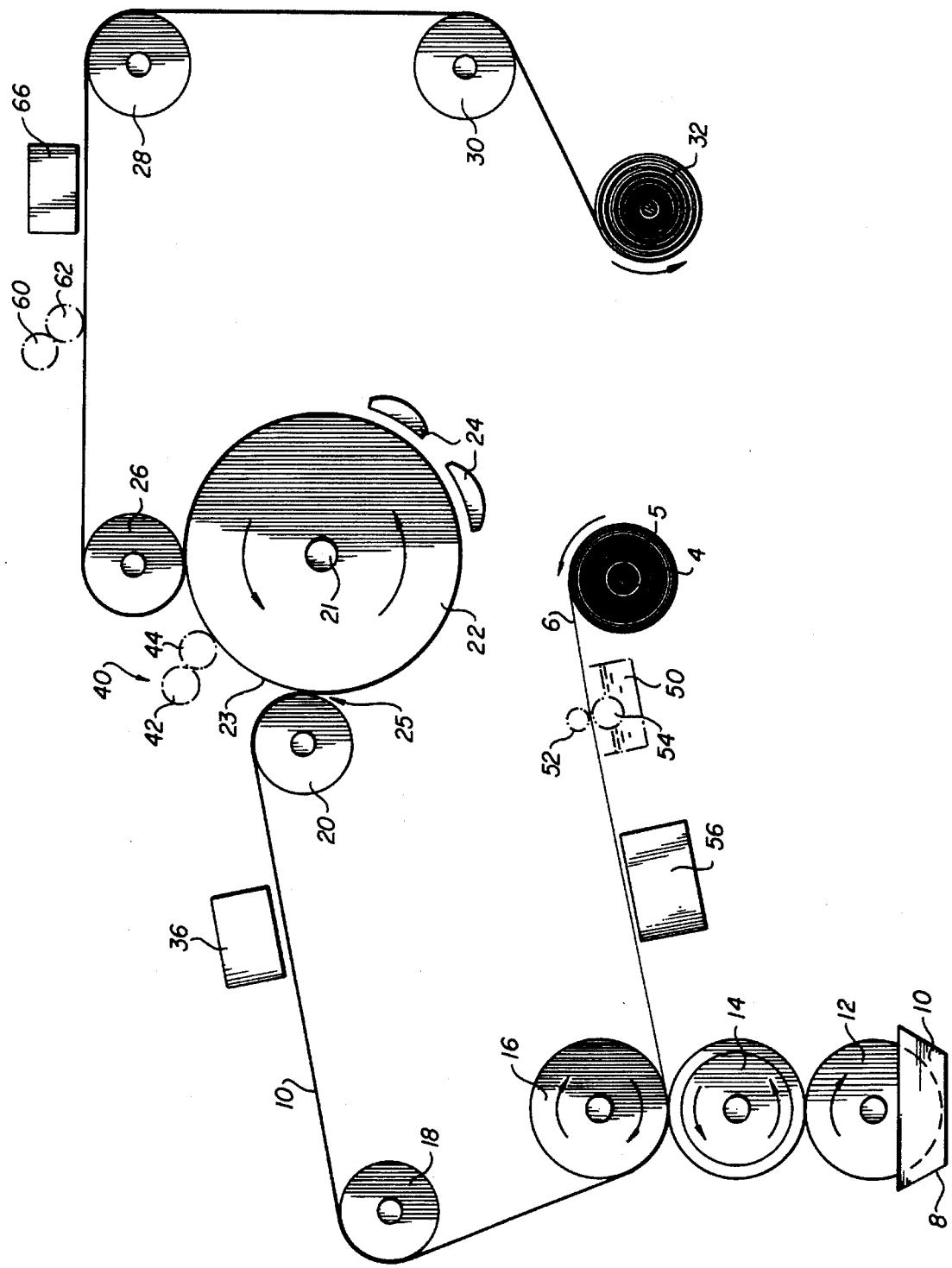

METHOD FOR PRODUCTION OF A COATED SUBSTRATE WITH CONTROLLED SURFACE CHARACTERISTICS

This is a continuation of application Ser. No. 07/171,207 filed on Mar. 18, 1988, which is a file wrapper continuation of application Ser. No. 06/812,619 filed on Dec. 23, 1985, both abandoned.

BACKGROUND OF THE INVENTION

This invention relates to a method for providing a coating on the surface of a polymeric substrate. More particularly, it relates to an improved method for providing an abrasion-resistant, radiation-cured coating on the surface of a polycarbonate substrate, and the article produced from the process.

Polymeric substrates are often provided with protective coatings. When it is important that the substrate be transparent, it is generally also important that the coating exhibit high optical quality while also retaining its other physical attributes, such as abrasion resistance and high gloss.

The coatings of the prior art are typically formed from various synthetic polymers and contain considerable amounts of volatile organic solvents which enhance the flow and leveling characteristics of the coating on the substrate. However, the inclusion of considerable amounts of volatile organic solvents creates several problems. First, the volatile material has to be eliminated from the cured coating so that it will not decrease the integrity of the coating. Therefore, expensive dryer systems have to be implemented to evaporate the solvents after the film is applied. Furthermore, other expensive equipment is required to remove the organic vapors from the work facility, and to comply with environmental requirements regarding atmospheric emissions and waste water disposal. Moreover, the presence of organic solvents creates explosion and fire hazards which have to be eliminated through the use of additional safety equipment and explosion-proof facilities. Finally, the purchase of solvents as additional raw materials for the coatings represents a substantial expense which further increases the cost of the resulting products.

One method for reducing the presence of organic solvents in coatings of this nature involves the use of radiation-curable coatings formed from various monomers and cross-linking oligomers, in which the monomer acts as a solvent by providing the necessary physical and theological properties for the uncured coating. Curing occurs when radiation is applied directly to the article surface having the coating thereon. The monomer enters the polymerization with the cross-linking oligomers and does not volatilize. The need for volatile solvents is thus eliminated or at least greatly reduced. However, several disadvantages exist with radiation-curable coatings. For instance, polymerizable monomers are not as effective as volatile solvent systems in the enhancement of flow and leveling of the coating on the substrate and therefore, the optical quality of the finished article is compromised. Moreover, oxygen which is present in the vicinity of the coating (and, to a lesser extent, within the coating material itself) often must be excluded during the curing process so that a coating having high optical clarity, abrasion resistance and chemical resistance may be formed. The elimination of oxygen is accomplished by continuously purging the cure chamber with nitrogen gas. However, a significant expense is required for the purchase of large volumes of nitrogen and for the maintenance of the purging equipment. Furthermore, safety equipment must be installed to protect operating personnel from accidental asphyxiation.

OBJECTS OF THE INVENTION

Accordingly, it is the primary object of the present invention to provide an improved process for coating the surface of a polymeric substrate which overcomes the foregoing disadvantages.

It is another object of the present invention to provide an abrasion-resistant coating on a surface of a polymeric substrate without the use of volatile organic solvents.

It is yet another object of the present invention to provide an abrasion-resistant, radiation-cured coating on a polymeric substrate surface without the use of a nitrogen blanket.

Yet another object of the present invention is to provide a method of forming an abrasion-resistant coating having controlled surface characteristics.

Still another object of the present invention is to provide an article comprising a polymeric substrate having an abrasion-resistant coating firmly adhered thereto.

These and other objects and advantages of the present invention will become apparent to those skilled in the art as the description thereof proceeds.

SUMMARY OF THE INVENTION

The foregoing objects are generally achieved by a method for providing an abrasion-resistant, radiation-cured coating on a surface of a polymeric substrate capable of allowing the passage of radiant energy therethrough, comprising the steps of:

(a) applying the uncured coating material to the substrate;

(b) expelling air from the uncured material coating; and (c) contacting the coating with radiant energy by directing the radiant energy through the substrate from the surface opposite the surface having the radiation-curable coating thereon, thereby curing the coating.

Thee substrate may be any conventional polymeric film or sheet material which is flexible and is capable of receiving a coating material as it passes through a coating means. The radiation-curable coating must be capable of adhering to the substrate, and is generally a nonvolatile coating comprising a cross-linkable resin and a photoinitiator.

In a preferred embodiment of the present invention, air is expelled from the uncured coating by passing the substrate having; the uncured coating thereon through an adjustable air expulsion nip defined by the interface between a rotating nip roll and the surface of a rotating casting drum contacting the nip roll, such that the compression formed within the air expulsion nip upon the coating is sufficient to eliminate air from the coating and from the interface between the coating and the surface of the casting drum.

Many of the typical forms of radiant energy may be used in the process of the present invention. Moreover, a plurality of layers of cross-linkable coatings may be applied to the surface of the substrate by this method. The radiation-curable coatings used in the present invention may also be applied on the surface of conventionally applied coatings, or they may serve as preliminary coatings for subsequently-deposited conventional coatings.

The use of the improved process of the present invention results in an article having an abrasion-resistant coating thereon with excellent physical characteristics, such as hardness and chemical resistance, as well as a high degree of optical clarity. Furthermore, the process eliminates the need for organic solvent-based coatings, as well as eliminating the need for a nitrogen blanket in radiation-curable systems.

BRIEF DESCRIPTION OF THE DRAWINGS

The FIGURE is a perspective view of one embodiment of the apparatus used in the method of the present invention, in which a radiation-curable coating is applied to and cured on a polymeric substrate. The elements in the FIGURE which are drawn with broken lines represent optional, additional embodiments of the present invention.

DESCRIPTION OF THE INVENTION

The method of the present invention is suitable for providing an abrasion-resistant, radiation-cured coating on the surface of a wide range of polymeric substrates which may be in the form of sheets, films, laminates, etc. While the particular apparatus depicted in the FIGURE is intended for the application and cure of a coating material on a continuous film of the substrate, the apparatus may be easily modified to apply and cure such a coating material on individual sheets of the substrate. The composition of the substrate is not critical and may include acrylics, polyesters, polycarbonates, phenolics, urethanes, etc., or mixtures thereof. The only restriction on the choice of the substrate is that it be flexible and capable of allowing the passage of at least one form of radiant energy therethrough, and that its properties not be unacceptably affected by such passage of radiant energy. The radiant energy source is selected to operate at a frequency at which there is little or no absorption of the energy by the substrate. A preferred substrate for the method of the present invention is one formed from a thermoplastic polycarbonate material, such as Lexan® resin, a product of General Electric Company. Typical examples of polycarbonate resins are described in U.S. Pat. No. 4,351,920, and are obtained by the reaction of aromatic dihydroxy compounds with phosgene, as well as those obtained by the reaction of aromatic dihydroxy compounds with carbonate precursors such as diaryl carbonates. U.S. Pat. No. 4,351,920 also describes various methods for the preparation of polycarbonate resins which may be used as substrates in the present invention. Polycarbonate film may be made by well-known methods. Typically, the molten polycarbonate is cast onto an extrusion roll stack, and both sides of the material are polished and pressed to a uniform thickness. After cooling, the film is ready for having a coating applied thereon. Polycarbonate materials generally have known absorption spectra and, therefore, the most appropriate form of radiant energy used in the method of the present invention may be easily selected. Generally, ultraviolet (UV) radiation is used as the energy source when curing coatings on polycarbonate substrates. If another type of substrate is desired, an appropriate radiant energy source may be selected (as described below), based upon the particular absorption spectra of the material and upon the amenability of the material to radiant energy passing therethrough. The thickness of the substrate is not critical and may range from about 0.5 mil to about 30 mils, depending in part on both the end use contemplated for the article and upon the ability of the substrate to remain flexible.

The radiation-curable coating used in the method of the present invention may comprise a wide variety of compositions. The choice of a particular coating will depend on several factors, such as the type of substrate used, the particular type of radiant energy applied, and the particular physical properties desired for the coating. Typical radiation-curable coatings are described in the Kirk-Othmer Encyclopedia of Chemical Technology, Third Edition, Volume 19, 1982, pp. 607–622. The radiation-curable coating systems are generally comprised of polymers containing acrylic, methacrylic or fumaric vinyl unsaturation along or attached to the polymer backbone. The coating systems generally also comprise monomers having a molecular weight of from about 100 to 500, and having single unsaturation sites. Typical of these are high boiling acrylate esters, although styrene may also be used as a monomer in selected formulations. A cross-linking oligomer containing di-, tri-, or multifunctional unsaturation sites is generally also a part of the radiation-curable coating system. Typical coating formulation ingredients are listed on page 617 of the Kirk-Othmer reference cited above. It is preferred in the practice of the present invention that the coating be non-volatile, although a coating material containing volatile components may also be used if certain modifications are made, as described below.

In those instances in which the substrate is a polycarbonate material, ultraviolet (UV) radiation is the preferred radiant energy media, and therefore, a UV-curable coating material is required. Any of the well-known UV-curable coating compositions are suitable for the present invention. One typical UV-curable coating composition is described in U.S. Pat. No. 4,477,529, incorporated herein by reference, and comprises azobisisobutyronitrile, at least one UV-curable cross-linkable polyfunctional acrylate monomer, and a polysiloxane-polyether block copolymer. Another suitable coating composition for the present invention is described in U.S. Pat. No. 4,198,465, incorporated herein by reference, and comprises a photoinitiator, a UV light curable cross-linkable polyfunctional acrylate monomer, and resorcinol monobenzoate. Methods of preparing UV-curable compositions are also well-known in the art; one such method is described in U.S. Pat. No. 4,198,465.

A typical apparatus for applying and curing a coating on the surface of a polymeric substrate in accordance with the method of the present invention is depicted in the drawing, although it is to be understood that any conventional system or device may be used for metering or doctoring the coating material on the surface of the substrate. In the FIGURE, radiation-curable coating material 10 in reservoir 8 is continuously taken up by gravure roll 12. The use of a gravure roll coating system is well-known in the art and is described, for example, in U.S. Pat. No. 4,302,486. Typically, the gravure roll has a ridged surface (not shown), with steel bars or a pattern of ridged dikes protruding from the roll surface, the depressions formed from such an array being capable of picking up and retaining the coating material 10 within reservoir 8. This arrangement allows coating material 10, while riding on the surface of gravure roll 12 which revolves in a clockwise direction, to be transferred to transfer roll 14, which is in circumferential contact with roll 12, and which revolves in a counterclockwise direction. Transfer roll 14 is driven by an outside power source (not shown) and will thereby coordinate the movement of gravure roll 12 (which may also be driven by an outside power source, not shown), and impression roll 16, described below.

Substrate roll 4 is formed from a roll of uncoated substrate 6 surrounding a core 5. Substrate 6 is unwound pursuant to the movement of casting drum 22 (described below), and is passed through a nip defined by the junction of transfer roll 14 and impression roll 16. Impression roll 16, rotating in a clockwise direction (i.e. in a direction opposite that of transfer roll 14), compresses- substrate 6 against transfer roll 14, the latter having coating material 10 on its surface. In this manner, coating material 10 may be uniformly applied to the surface of substrate 6. It will be apparent to those skilled in the art that adjustments may be made in the coating system in order to apply the coating to the substrate efficiently. Typical adjustments involve roll speed, coating material viscosities, and nip spacings. Furthermore, it is not critical in the method of the present invention to apply coating material 10 by gravure roll means, as described above. Coating material 10 may also be applied to substrate 6 by any of a number of well-known coating methods, such as spraying, brushing, electrodeposition, curtain coating, and dipping, as well as other well-known roll coating methods, such as reverse roll coating, etc. The thickness of radiation-curable coating 10 is dependent upon the end use of the article and the physical properties desired, and may range from about 0.05 mil to about 5.0 mils for a nonvolatile coating. The preferred nonvolatile thickness is from about 0.2 mil to about 1.0 mil.

After coating material 10 is applied to substrate 6, substrate 6 is guided around idler roll 18 to nip roll 20. The choice of materials which form the rolls used in the present invention is not critical. The rolls may be made of plastic, metal (i.e. stainless steel, aluminum), rubber, ceramic materials, and the like. Furthermore, the surface of each roll should be smooth and resilient. Typically, each roll is provided with a sleeve or cover on its surface. Nip roll 20 may be provided with such a sleeve, preferably formed from a resilient material such as tetrafluoroethylene or polypropylene, or from one of the variety of currently available synthetic rubber compounds and blends thereof. The sleeve is snugly fitted over the roll surface to provide a smooth, friction-minimizing surface for contacting substrate 6. Nip roll 20 is adjustable relative to the position of casting drum 22, described below, and may optionally be independently driven.

As shown in the FIGURE, casting drum 22 is situated in a position adjacent nip roll 20, such that the outer circumferences of nip roll 20 and drum 22 are in contact with each other at an interface defining a nip 25 which is described below. For the purpose of clarity, this particular nip will hereinafter be referred to as the air expulsion nip. The applied pressure at the interface of nip roll 20 and drum 22 may be adjusted by well-known methods, such as a spring mechanism (not shown), attached to the axle of nip roll 20, which selectively urges the roll toward drum 22. Typically, the applied pressure at the interface is slight, i.e. less than 5 pounds per square inch, when the substrate is not passing through air expulsion nip 25. The applied pressure can be readjusted according to a variety of parameters when a substrate having a coating thereon is passing through nip 25, as described below.

Drum 22 surrounds central axle 21, and may be made from a wide variety of materials, such as various plastics, ceramics or metals. Typically, the drum is comprised of stainless steel or chromium-plated steel. Furthermore, it is preferred that the drum be independently driven by an outside power source (not shown).

Casting drum surface 23 may be provided with a wide variety of textures or patterns, depending upon the texture or pattern desired to be imparted to coating 10. For instance, surface 23 may be provided with a highly polished chrome-plated surface if a high degree of gloss is desired for coating 10. If a lower sheen is desired for the coating, surface 23 may be less polished, or may be rubberized so as to provide a matte texture to the coating. Similarly, a design pattern may be embossed on surface 23 to impart a mirror-image design pattern to coating 10. The cured coating 10 will thus become a permanent mirror-image of casting drum surface 23.

In order to ensure the exclusion of air from and adjacent to coating 10 prior to curing, without the use of a nitrogen gas blanket, the pressure capable of being exerted at air expulsion nip 25 is carefully adjusted. The adjustment of applied pressure at air expulsion nip 25 may be accomplished as described above. The exact pressure that can be exerted at nip 25 will depend on many factors, e.g., the viscosity of coating 10, the degree of detail in the design pattern on surface 23 (if present), and the thickness of coating 10. Typically, for a substrate having a thickness of 5 mils having applied thereon an acrylic-based coating having a thickness of 0.6 mil and a viscosity of 800 centipoises, an air expulsion nip pressure of 25 pounds/square inch applied to the coated substrate is sufficient to expel any air which is within coating 10 and which is between coating 10 and drum surface 23. Coating 10 is thereby pressed into full anaerobic contact with both substrate 6 and casting drum surface 23, thereby ensuring that the coating, when cured, will exhibit strong adherence to substrate 6 while also exhibiting a mirror image of the texture and/or pattern of casting drum surface 23.

After substrate 6 having coating 10 applied thereon passes through air expulsion nip 25, the coating is cured by means of radiant energy. As shown in the FIGURE, radiant energy is transmitted from radiant energy means 24 into the surface of substrate 6 opposite the surface having coating 10 thereon, i.e., the bottom surface of substrate 6. The radiant energy passes through the transparent substrate and is absorbed by the coating, the latter being compressed between substrate 6 and drum surface 23. As mentioned above, the choice of a radiant energy source will depend upon several factors, including the chemical nature of the substrate as well as the chemical nature of the coating material being cured. It is important to select a radiant energy source which will not adversely affect substrate 6, e.g. by causing discoloration of the substrate. In those instances in which acrylic-based coatings are applied to polycarbonate substrates, the most appropriate radiant energy source is UV radiation. The preferred wavelength of the UV radiation is from about 1800 Angstroms to about 4000 Angstroms. The lamp system used to generate such UV radiation may consist of discharge lamps, e.g. xenon, metallic halide, metallic arc, or high, medium, or low pressure mercury vapor discharge lamps, etc., each having operating pressures of from as low as a few milli-torrs up to about 10 atmospheres. The radiation dose level applied to coating 10 through substrate 6 may range from about 2.0 J/cm$^2$ to about 10.0 J/cm$^2$. A typical UV curing system suitable for the present invention is a Linde medium pressure mercury lamp, as described in U.S. Pat. No. 4,477,529. The number of lamps directing UV light to the surface of the substrate is not critical; however, a greater number of lamps may allow a higher production rate for the substrate having coating 10 thereon. Typically, two lamps, each producing 200 watts/linear inch of radiant energy, are sufficient for an acrylic-based coating having a thickness of about 0.5 mils, when the production line speed is about 50 feet/minute. Such a curing procedure should result in both the polymerization of the polyfunctional acrylic monomers and the cross-linking of the polymers to form hard, abrasion-resistant, non-tacky coatings. It will be understood to those skilled in the art that different substrates and different coating systems may require the use of different forms of radiant energy, such as electron beam curing, gamma ray curing, infrared curing, and curing methods which use visible wavelengths of light. Many of these methods are described in detail, along with descriptions of polymeric coatings amenable to cure by such methods, in the Kirk-Othmer reference cited above.

In certain instances it may be desirable to provide additional lamps adjacent lamps 24 to emit a form of radiant energy suitable for curing coatings on other types of substrates. These lamps would remain inactive until a new substrate having coating 10 applied thereon reaches a position along drum surface 23 directly aligned with these lamps. While the coating on the new substrate is being cured, lamps 24 would remain inactive. Furthermore, additional lamps may be selectively activated when a different type of coating is being cured.

In certain embodiments within the scope of the present invention, it may be desirable to apply coating material 10 in two or more layers. For instance, if the coating is to include an additive that might easily be leached by weather or ageing conditions, it may be desirable to incorporate the additive into the first coating layer and omit it from a second protective layer applied to the first layer prior to curing both layers simultaneously by radiant energy means. As depicted in the FIGURE, a two-layer coating may be achieved by the addition of coating station 40. The particular means for applying the second layer is not critical to the invention; such means are well-known to those skilled in the art. In this embodiment of the present invention, a first layer of coating material may be applied by the gravure roll apparatus described above. After the coating material has been applied to substrate 6, the substrate is guided around idler roll 18 and nip roll 20. Simultaneously, a second layer of coating material from a reservoir (not shown) is applied to casting drum surface 23 by means of secondary gravure roll 42 and secondary transfer roll 44. In the presently-described embodiment, the second layer material is comprised of the same material as the first layer, and typically has a thickness (when cured) of about 0.2 mils to about 3.0 mils when the first layer has a thickness of about 0.05 mil to about 2.0 mils (when cured). Generally, the combined thickness of the first and second coating layers ranges from about 0.25 mils to about 5.0 mils. As in the case of the nips of the previously-described embodiment, the nip between secondary transfer roll 44 and casting drum 22 may be adjusted by well-known methods to suit the particular characteristics of the second layer. Thus, the second layer is applied to substrate 6 while the substrate, having the first layer thereon (uncured), passes through air expulsion nip 25. The elimination of air from between both layers is thus achieved simultaneously as the substrate passes through air expulsion nip. Both coatings may then be cured by means of the radiant energy lamps 24, as described above.

It will be apparent to those well-skilled in the art that the first and second (or additional) layers may be comprised of different types of materials, depending upon the particular end use requirements for the coated substrate. In this instance, additional radiation lamps may be situated opposite the circumference of casting drum 22 and adjacent lamps 24 to emit the particular type of radiant energy appropriate for curing each layer of coating material.

After one or more layers of coating material have been applied to and cured on substrate 6 according to the method of the present invention, the resulting product is guided around idler rolls 28 and 30 and then collected on take-up roll 32, the latter typically being independently driven and capable of separating cured coating 10 from drum surface-23.

In certain embodiments within the scope of the present invention, it may be desirable to apply a radiation-curable coating 10 which contains some volatile components. Since such volatile components may adversely affect the ability to eliminate air from the coating and surrounding region, they should be removed from the coating prior to cure. This may be accomplished by drying station 36, as depicted in the FIGURE. Drying station 36 is typically a forced hot-air oven system having vapor exhaust means, although any type of ventilated furnace will be suitable for this function. The drying station is typically situated at some point along the process pathway between impression roll 16 and nip roll 20, as shown in the FIGURE. The volatile components in the coating material are thereby eliminated prior to the radiation curing of the coating.

In another embodiment of the present invention, a preliminary coating material may be applied to substrate 6 prior to the application of one or more of the radiation-curable coatings described above. The preliminary coating is generally a conventional coating, which is air-dried or cured by the application of heat, and not by radiant energy. Typical examples of conventional thermoplastic coating materials used as preliminary coatings for the present invention are acrylic-based lacquers. Typical examples of conventional heat-curable thermosetting coating materials which may be used as preliminary coatings for the present invention include those comprising phenolics, alkyds, polyesters, epoxides, silicones, etc. The only requirements for materials used as preliminary coatings for the present invention is that they be physically and chemically compatible with the subsequently applied radiation-curable coatings, and that they be somewhat transparent to and not unacceptably affected by the radiant energy media used in that particular curing system. Preliminary conventional coating material 50 may be applied to substrate 6 by various methods well-known in the art, e.g. spraying, brushing, roll-coating and the like. In the FIGURE, for example, preliminary coating material 50 is applied to substrate 6 by means of rotating coating roll 54. After the preliminary coating has been applied to the substrate, the Substrate passes through furnace 56, if necessary, to cure preliminary conventional coating 50. The substrate will then have the radiation-curable coating applied and cured thereon, as described in detail above.

In another embodiment of the present invention, a topcoat may be applied to the substrate on top of the radiation-cured coating(s). The composition of the topcoat may be selected from any of the conventional thermoplastic or thermosetting coating materials described above as being suitable for the preliminary coating. Additionally, the topcoat may comprise materials which are not transparent to radiant energy, e.g. pigmented coating materials, etc. Furthermore, the coating material may include materials which might be adversely affected by radiant energy, since radiant energy is no longer utilized at this stage. The topcoat may be applied to the coated substrate 6 by any of the well-known methods described above. In the FIGURE, the topcoat material is stored in a reservoir (not shown) and is applied through the use of topcoat transfer roll 62 adjacent topcoat gravure roll 60. The topcoat may be cured through the use of furnace means 66, if necessary. Furthermore, the scope of the present invention encompasses the use of both a preliminary coating and a topcoat in conjunction with one or more radiation-curable coatings.

It will be understood by those skilled in the art that a nitrogen blanket may be used alone or in conjunction with the apparatus and preferred methods of the present invention.

The following specific example describes the novel methods and article of the present invention. It is intended for illustrative purposes of specific embodiments only and should not be construed as a limitation upon the broadest aspects of the invention.

EXAMPLE

Twelve samples of various coating materials were used for several comparative tests. All of the coating materials were 100% reactive solids formulations with viscosities that ranged from 40 cps to 90 cps. The coating material for samples 1 and 2 was produced by the Sherwin Wililiams Company and was a commercially available 100% solids UV-curable formulation sold as V88 VC-1. The coating material for samples 3 and 4 was also made by Sherwin Williams and was a developmental UV-curable acrylic formulation which was designated as 94-B. Samples 5 and 6 were a composition from DeSoto Chemical Company, commercially available as Desolite 950×343. The composition of samples 7, 8 and 9 was from the General Electric Company and contained the following ingredients: 43.3% trimethylolpropane triacrylate; 43.3% hexanediol diacrylate; 4.4% resorcinol monobenzoate; 4.5% triethanolamine; 4.5% benzophenone. The composition of samples 10, 11 and 12 was also from General Electric and contained the following ingredients: 44.9% trimethylolpropane triacrylate; 44.9% hexanediol diacrylate; 4.5% resorcinol monobenzoate; 3.8% triethanolamine; 1.9% benzophenone.

Each sample was applied as one layer on a Lexan substrate having a thickness of about 10 mils by means of the apparatus depicted in the FIGURE and described above. The samples were radiation-cured by means of two Linde medium pressure mercury lamps as described in U.S. Pat. No. 4,477,529, operating at a total dose level of 6.2 joules/cm². Samples 1, 3, 5, 7 and 10 were cured in an air atmosphere, i.e., without the use of the air expulsion nip of the present invention, by directing the radiant energy source directly upon the coating material. Samples 2, 4, 6, 8 and 11 were cured in a nitrogen atmosphere, i.e., under a nitrogen blanket, without the use of the air expulsion nip of the present invention, by directing the radiant energy source directly upon the coating material. Samples 9 and 12 were cured according to the method of the present invention, i.e., air was expelled from the coating and from the interface between the coating and the casting drum surface by means of the air expulsion nip depicted in the FIGURE. The thickness of the cured coatings far each sample was about 0.2 mil to about 0.3 mil.

Abrasion and adhesion tests were performed on each coated substrate. The abrasion test was performed with a Taber Abraset, using a CS-10-F abrasive wheel and a 500 gram load. A higher Taber value represents the increase in the percentage of haze on the cured coating after 100 abraser cycles.

The adhesion test was performed by crosshatching the cured coating of each sample, followed by a tape pull. No removal of the coating from the substrate indicates excellent adhesion, while a larger amount of coating removed indicates poorer adhesion.

The test results are displayed in Table 1:

TABLE 1

| SAMPLE NUMBER | CURE ATMOSPHERE[a] | ABRASION VALUE[b] | ADHESION RATING |
| --- | --- | --- | --- |
| 1 | Air | 3.5 | Good |
| 2 | $N_2$ | 2.4 | Excellent |
| 3 | Air | 11.0 | Excellent |
| 4 | $N_2$ | 2.5 | Excellent |
| 5 | Air | 4.8 | Poor |
| 6 | $N_2$ | 2.8 | Good |
| 7 | Air | 12.2 | Poor |
| 8 | $N_2$ | 5.1 | Good |
| 9 | A.E.N. | 4.4 | Good |
| 10 | Air | 8.0 | Good |
| 11 | $N_2$ | 3.4 | Excellent |
| 12 | A.E.N. | 4.1 | Excellent |

[a] $N_2$ = Nitrogen; A.E.N = Air Expulsion Nip
[b] Abrasion Value = Taber Value The abrasion and adhesion test results for samples 1–6 indicate that coatings cured in a nitrogen atmosphere have superior abrasion resistance (lower abrasion values) and adhesion as compared to coatings cured in an air atmosphere, The results of tests performed on samples 7–12 demonstrate that coatings applied and cured by the preferred method of the present invention (samples 9 and 12) exhibit adhesion and abrasion resistance characteristics which are generally as good as or better than those of the coatings cured in air or nitrogen, The article produced by all of the embodiments of the improved method of the present invention is characterized by excellent scratch resistance, abrasion resistance, solvent resistance, and high optical properties. Furthermore, the coated article resulting from the process of the present invention exhibits high physical integrity because defects which would normally result from the trapping of oxygen within cured coatings are not present. The process also results in the coating surface having any desired texture or pattern. The preferred process of the present invention results in shorter processing times and lower overall production costs for the article because of the elimination of a nitrogen atmosphere.

While the invention has been described with respect to preferred embodiments, it will be apparent that certain modifications and changes can be made without departing from the spirit and scope of the invention. It is therefore intended that the foregoing disclosure be limited only by the claims appended hereto.

What is claimed is:

1. A method for producing a high optical quality, flexible, transparent, abrasion resistant polycarbonate article, said article having a polycarbonate film substrate and an abrasion resistant radiation cured coating adhered to said substrate, said substrate having a thickness selected from the range of about 5 mil to about 30 mil, said coating having a thickness selected from the range of 0.05 mil to 5.0 mil, said method comprising the steps of:

(a) applying an ultraviolet radiation curable uncured coating material and a photoinitiator to at least one surface of the substrate;

(b) passing the substrate having the uncured coating thereon through a compression nip defined by a nip roll and a casting drum, said casting drum having a metal surface, said compression nip applying an exact pressure to said uncured coating and substrate to exclude air from within said coating and to press simultaneously said coating into full dual anaerobic contact with both (a) the substrate to remove and to exclude any air between said coating and said substrate to provide improved adhesion between said coating and said substrate and (b) the drum to exclude any air between said coating and said drum to provide improved surface appearance; and (c) curing the uncured coating by directing the ultraviolet radiant energy through the substrate from the surface opposite the surface having the coating thereon to contact and cure the radiation-curable coating while the coating is in anaerobic contact with the drum.

2. The method of claim 1 wherein the surface of the casting drum contacting the uncured coating is patterned so as to impart to the coating a texture which is a mirror-image of the pattern on the casting drum surface.

3. The method of claim 1 wherein the uncured coating material is applied to the substrate by gravure roll means.

4. The method of claim 1 further comprising applying and curing a conventional coating on the surface of the radiation-cured coating after step (c).

5. The method of claim 4 wherein the conventional coating is a heat-curable thermosetting material.

6. The method of claim 4 wherein the conventional coating is a thermoplastic material.

7. The method of claim 1 wherein the uncuring coating is nonvolatile.

8. The method of claim 1 wherein the coating material is applied as two layers.

9. The method of claim 8 wherein the second layer of coating material is applied on the surface of the first layer of coating material while the first layer is in an uncured state.

10. The article produced by the method of claim 1.

11. The method of claim 1 wherein said pressure of said compression nip may be adjusted.

12. A method for producing an abrasion resistant, transparent polycarbonate film, said film comprising a transparent polycarbonate substrate having a thickness selected from the range of 5 mils to 30 mils, said film further comprising an abrasion resistant cured acrylate coating adhered to said substrate, said coating having a thickness selected from the range of 0.05 mil to 5.0 mils, said method comprising:

(a) contacting an ultraviolet radiation curable polyfunctional acrylate coating material and a photoinitiator with a surface of the substrate;

(b) passing the substrate having the uncured coating material thereon through a compression nip defined by a nip roll and a casting drum, said casting drum having a metal surface, said compression nip applying an exact pressure to said uncured coating material and substrate to exclude air from within said coating material and to press simultaneously said coating material by the nip roll into full dual anaerobic contact with both (a) the substrate to remove and to exclude any air between said coating and said substrate to provide improved adhesion between said coating and said substrate and (b) the drum to exclude any air between said coating and said drum to provide improved surface appearance; and (c) curing the coating material by directing ultraviolet radiant energy through the transparent polycarbonate substrate to contact and cure the radiation-curable coating while the coating is in anaerobic contact with the drum.

13. The method of claim 12 wherein said metal surface is a chrome plated surface.

14. The method of claim 13 wherein said drum surface is highly polished and imparts a high degree of gloss to said coating.

* * * * *